(12) United States Patent
Suzuki

(10) Patent No.: US 6,855,217 B2
(45) Date of Patent: Feb. 15, 2005

(54) METHOD OF BAKING TREATMENT OF STEEL PRODUCT PARTS

(75) Inventor: Takamasa Suzuki, Niwa-gun (JP)

(73) Assignee: Aoyama Seisakusho Co., Ltd. (JP)

( * ) Notice: Subject to any disclaimer, the term of this patent is extended or adjusted under 35 U.S.C. 154(b) by 33 days.

(21) Appl. No.: 10/274,807

(22) Filed: Oct. 21, 2002

(65) Prior Publication Data

US 2003/0037849 A1 Feb. 27, 2003

Related U.S. Application Data

(63) Continuation of application No. PCT/JP01/10606, filed on Dec. 5, 2001.

(30) Foreign Application Priority Data

Dec. 7, 2000 (JP) .................................. 2000-372732

(51) Int. Cl.$^7$ .............................. C21D 1/42; C21D 9/00
(52) U.S. Cl. ........................................ 148/567; 148/566
(58) Field of Search ................................ 148/567, 533, 148/566, 224; 428/659

(56) References Cited

U.S. PATENT DOCUMENTS 5,906,691 A * 5/1999 Burnett et al. ............... 148/567

FOREIGN PATENT DOCUMENTS

| JP | 60-096715 | 3/1985 |
| JP | 05-140642 | 6/1993 |
| JP | 10-204536 | 8/1998 |
| JP | 11-124683 | 5/1999 |

* cited by examiner

Primary Examiner—Deborah Yee
(74) Attorney, Agent, or Firm—Fitch, Even, Tabin & Flannery

(57) ABSTRACT

The present invention relates to a method of baking treatment of steel product parts using a high frequency or ultra-high frequency for preventing delayed fracture from occurring due to diffusive hydrogen occluded in steel parts, for example, screws, bolts and the like, or for heating surface layers of the steel parts to generate a difference in temperature between the surface layers and interiors of the steel parts, thereby causing distortion in lattices, wherein the surface layers of the steel parts are rapidly heated to 100 to 300° C. with a high frequency or ultra-high frequency at 10 KHz or higher to remove the diffusive hydrogen which is involved in hydrogen embrittlement, or to transfer an existing state to non-diffusive hydrogen which is not involved in the hydrogen embrittlement.

19 Claims, 1 Drawing Sheet

METHOD OF BAKING TREATMENT OF STEEL PRODUCT PARTS

This is a continuation, of prior application number PCT/JP01/10606, filed Dec. 5, 2001 and designating the U.S. which is hereby incorporated herein by reference in its entirety.

TECHNICAL FIELD

The present invention relates to a method of baking treatment for removing hydrogen occluded in steel product parts (hereinafter called "steel parts"), particularly, diffusive hydrogen which is one of causes for delayed fracture, or for making the hydrogen harmless.

BACKGROUND ART

Conventionally, so-called delayed fracture is known, i.e., sudden brittle fracture of a steel product under static stress after the lapse of a certain time. Such delayed fracture is believed to be caused, as one of factors, by atomic hydrogen (H) intervening in interstitial iron atom or atomic hydrogen trapped in lattice defects rather than molecular hydrogen ($H_2$) trapped in voids within steel or interfaces between steel matrix and non-metallic inclusion.

The atomic diffusive hydrogen is (1) hydrogen within molten steel which remains in final steel products or steel parts; (2) hydrogen penetrating into a steel product or steel parts due to corrosion under the atmospheric environment or during pickling or electroplating process; and (3) hydrogen penetrating into a steel product or steel parts from the atmosphere during carburizing, nitridation, welding; and the like. The delayed fracture is believed to occur when a hydrogen concentration within a steel product exceeds a critical hydrogen concentration of fracture.

In steel parts, screws such as wood screws, tapping screws and the like are formed using a low carbon aluminum killed steel wire such as SWRCH18A through cold forging. These screws are subjected to a heat treatment such as carburizing and quenching after formation for improving screw performance of a screw tip when a screw is driven in, and increasing a torsional torque before the screw surfaces are plated by electrogalvanizing having the plating thickness of 5 to 20 $\mu$m for improving the corrosion resistance. Once hydrogen generated by the plating penetrates into a steel product, the hydrogen diffuses and readily migrates into screws, while a plated coating on the surface makes it difficult to remove the hydrogen from the surface, resulting in a higher hydrogen concentration within the screws. For this reason, as a certain time has elapsed after a screw was fastened with a predetermined torque, the screw is susceptible to a delayed fracture, so-called head-off of the screw.

In addition, screws hardened by the carburizing and quenching are formed with high carbon tempered martensite, in a surface layer, with approximately 0.8% of carbon. Since this tempered martensite is precipitated as grain boundary carbide at prior austenite grain boundaries, and agglomerated hydrogen further reduces a bonding strength of grain boundary, resulting in higher susceptibility to hydrogen embrittlement and hence higher susceptibility to delay fracture.

Further, steel parts manufactured from carbon steel or low-alloy steel, such as bolts, pins, washers, shafts, plates and the like are also increased in susceptibility to hydrogen embrittlement due to hydrogen in molten steel, or hydrogen penetrating into them during pickling to remove a scale on the surface of a steel product.

Therefore, conventionally, steel parts such as plated screws and the like have been baked, for example, at temperatures of approximately 200° C. for several hours in a furnace to reduce hydrogen concentrations therein.

However, the baking in a furnace may require to maintain heating for approximately four hours depending on the amount of hydrogen concentration or the size of part. Therefore, if the baking is conducted in a batch-type furnace, the productivity will be degraded, the total stock will be increased, and enhancement of facilities will be required. Also, when the baking is conducted using a continuous-type furnace, a long furnace having a long conveyer is required, resulting in a higher manufacturing cost.

DISCLOSURE OF THE INVENTION

It is an object of the present invention to provide a baking method which is capable of reducing a time required therefor without causing enhanced facilities, and as a result, to prevent the delayed fracture due to hydrogen embrittlement.

To achieve the above object, a method of baking steel parts according to the present invention is characterized by heating the steel parts with a high frequency or ultra-high frequency to remove diffusive hydrogen included in steel, or to transfer it to non-diffusive hydrogen, thereby making it harmless.

Also, the method of baking steel parts according to the present invention is characterized by heating only surface layers of steel parts to generate a difference in temperature between the surface layers and interiors of the parts, thereby causing distortion in lattices.

BEST MODE FOR CARRYING OUT THE INVENTION

Figure 1:
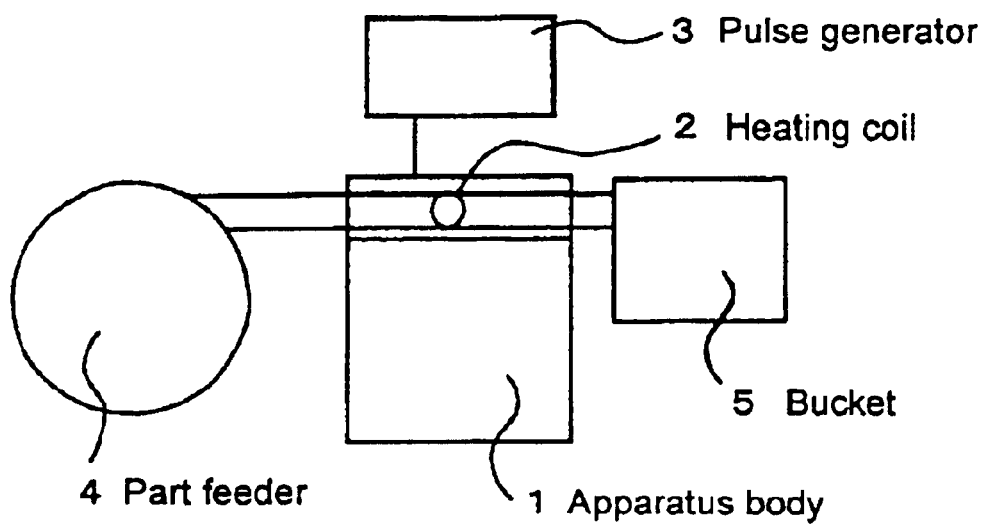
FIG. 1 is a general configuration diagram of an apparatus for use in a baking method according to the present invention.

The present invention has been completed by finding that (1) hydrogen occluded in a steel product is classified into diffusive hydrogen which can diffuse in the vicinity of room temperatures, and non-diffusive hydrogen which does not diffuse in the vicinity of room temperature, and hydrogen involved in the hydrogen embrittlement is the diffusive hydrogen, whereas the non-diffusive hydrogen is not involved in the hydrogen embrittlement; (2) the diffusive hydrogen exists at sites having low trap energy such as crystal grain boundary, dislocations and the like, while the non-diffusive hydrogen exists at sites having high trap energy such as carbide, porosity and the like; and (3) the baking can transfer the diffusive hydrogen to the non-diffusive hydrogen which is not involved in the hydrogen embrittlement as well as remove the diffusive hydrogen in a steel product.

In this specification, high frequency based heating means a heating method which relies on an induction heating by continuously or pulsatively outputting a current at frequencies in a range of 1 KHz to 5 MHz, and ultra-high frequency based heating means a heating method which relies on an induction heating by pulsatively outputting a current at frequencies equal to or higher than 5 MHz.

Particularly, since ultra-high frequency pulse output heating can not only rapidly heat surface layers of parts but also heat surface layers of steel parts to generate a difference in temperature between the surface layers and interiors of parts, so that the removal of diffusive hydrogen and transfer to non-diffusive hydrogen can be extremely efficiently achieved.

Steel parts subjected to the baking include, for example, screws such as wood screws, tapping screws and the like; parts made of carbon steel or low-alloy steel such as bolts, pins, washers, plates and the like; and other steel parts.

Steel parts having plated on surfaces include a large amount of hydrogen, generated during plating, in a plating layer, and the plating layer acts as a barrier against the emission of diffusive hydrogen, so that the hydrogen is more likely to be occluded as diffusive hydrogen. Thus, when the baking method of the present invention is applied to plated parts, particular effects are demonstrated. This is because the effect of transferring the existing state to non-diffusive hydrogen is larger than the effect of removing the diffusive hydrogen.

Also, when the high frequency or ultra-high frequency is increased to 10 KHz or higher, it is possible to concentrate the energy on surface layers of steel parts, which is preferable since the removal of hydrogen, particularly from plating layers and the like, and the transfer of the existing diffusive hydrogen to non-diffusive hydrogen are efficiently carried out.

Further, preferably, surface layers of steel parts are rapidly heated to 100–300° C. with a high frequency or ultra-high frequency from a viewpoint of the removal of diffusive hydrogen or elimination of harm associated with the transfer to non-diffusive hydrogen. Particularly, heating at approximately 200° C. is more preferable. That is, heating temperatures of the surface layer below 100° C. would insufficiently activate the diffusive hydrogen to result in a low emission efficiency of the hydrogen, while high temperatures exceeding 300° C. would promote oxidization on the surfaces of the parts to reduce the corrosion resistance and compromise the surface appearance.

In this event, if steel parts are heated with an ultra-high frequency pulse output, the surface layer of the steel parts can also be heated at a high energy density to generate a difference in temperature between the surface layers and interiors of the parts, thereby more effectively emitting diffusive hydrogen and making it harmless. More preferably, a heating coil is contained in a non-oxidizing furnace to heat steel parts at a high frequency or ultra-high frequency in a non-oxidizing atmosphere because the steel parts can be prevented from surface oxidization. Further preferably, a heating coil is contained in a vacuum furnace because the emission of diffusive hydrogen can be promoted, in addition to the prevention of surface oxidization.

In the following, the present invention will be described in detail with reference to the drawings.

A method of baking a steel part according to the present invention is characterized by heating at a high frequency or at an ultra-high frequency such that susceptibility to hydrogen embrittlement can be reduced by short-time processing, without enhancement of production facilities, in the baking for removing hydrogen occluded in steel parts or making the hydrogen harmless.

FIG. 1 is a general configuration diagram of an apparatus for use in the baking method according to the present invention. This high frequency baking apparatus body 1 comprises a heating coil 2 for heating steel parts continuously fed thereto from a part feeder 4 at a high frequency or an ultra-high frequency, and a pulse generator 3 when the high frequency or ultra-high frequency is pulsatively output. Then, as the baking is terminated near the heating coil 2, baked steel parts are discharged to a bucket 5 for delivery. For mass production, the apparatus illustrated in FIG. 1 is preferably adapted thereto.

Figure 2:
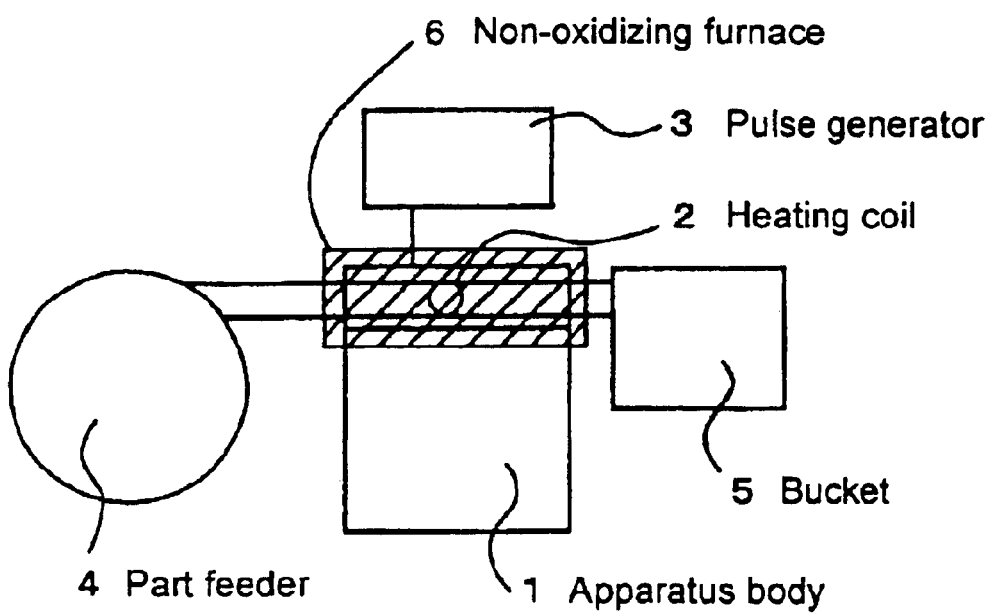
FIG. 2 is a general configuration diagram of an apparatus including a non-oxidizing furnace for use in the baking method according to the present invention.

FIG. 2 is a general configuration diagram of another apparatus for use in the baking method according to the present invention. A heating coil 2 for heating steel parts at a high frequency or an ultra-high frequency is contained in a non-oxidizing furnace 6, with the rest of configuration remaining similar to FIG. 1. As a non-oxidizing atmosphere, an inert gas such as nitrogen gas or argon gas can be used, and argon gas is particularly preferred.

Here, steel parts subjected to the processing are preferably carburized and quenched screws such as wood screws, tapping screws, self-drilling screws for use in assembly of steel houses, and the like; bolts, pins, washers, shafts, plates tempered through quenching and tempering process, using carbon steel such as S45C and SCM435, and other steel parts. As mentioned above, screws have been carburized on the surface thereof with the amount of carbon up to approximately 0.8%, and therefore exhibit extremely high susceptibility to hydrogen embrittlement.

Also, while the bolts are strengthened and toughened by the tempering treatment, the susceptibility to hydrogen embrittlement becomes higher as the strength is higher in high strength bolts, pins, washers, shafts, plates and the like having a tensile strength exceeding 1000 N/mm$^2$. Also, when such parts are plated for improving the corrosion resistance and the surface appearance, a plating layer includes a larger amount of hydrogen than within steel, so that the plating layer acts as a hydrogen source to increase the susceptibility to hydrogen embrittlement.

Therefore, application of the processing method of the present invention to such steel parts and plated parts is extremely effective.

Here, as the high frequency or ultra-high frequency of the high frequency hardening apparatus body 1, a frequency of 10 KHz or higher is continuously or pulsatively output. In this event, by employing a high frequency or ultra-high frequency of 4 MHz or higher to oscillate a pulse output having a high energy density for an extremely short time, a surface layer within approximately 1 mm deep from the surface, particularly, a thin plating layer can be intensively heated for a short time of approximately one second or shorter. Also, the surface layer can be heated by high density heating energy to generate a difference in temperature between the surface layer and interior of the part, thereby extremely efficiently emitting diffusive hydrogen and making it harmless. Also, the frequency is preferably increased to 20 MHz or higher, because only the vicinity of an ultra-surface layer of a steel part can be heated, so that an internal structure of the steel material is less affected.

As to such high frequencies, available frequencies are allocated by a regulatory authorization so as not to interfere with radio communications and the like.

Also, preferably, a heating temperature by the heating coil 2 is set such that surface layers of steel parts are heated to 100–300° C. This is because temperatures below 100° C. insufficiently activate diffusive hydrogen, whereas temperatures higher than that would promote oxidization on the surfaces of the parts to reduce the corrosion resistance and deteriorate the surface appearance.

EXAMPLES

Next, examples specifically processed by the baking method of the present invention will be described, however, the technical spirit of the present invention is not limited to these examples.

Example 1

M6 flat head tapping screws each having a weight of 6 g were manufactured using SAE1022 grade steel, the surfaces of the screws were galvanized in a thickness of 10 μm, and then the screw were left for 24 hours. A total of 100 Kg (16,600 pieces) of tapping screws were baked using the apparatus illustrated in FIG. 1. The frequency of the high frequency hardening apparatus body 1 was 27 MHz, and the pulse generator 3 was provided so that a rectangular pulse output having a high energy density could be oscillated for an extremely short time. Thus, heating can be turned ON and OFF 500 times per minute with a pulse output duration ranging from 1 to 100 ms, so that the surface layers of the steel parts can be rapidly heated to approximately 200° C. As a result, a time required for heating one screw was as short as approximately 0.005 seconds, so that a time required for baking the total amount of 100 kg of the tapping screws was 1.0 hour, and a significant reduction in time was achieved as compared with before.

Also, 100 pieces of the baked screws were driven into a steel plate of 2 mm thick, and fastened with a torque corresponding to 90% of fracture torque, and then immersed in a 5% salt solution in a 25° C. environment for 100 hours to conduct a salt solution immersion test for investigating the number of screws which were experienced head-off. The result showed that none of the screws experienced head-off.

Example 2

Using the same screws as the foregoing, the surface layers of the steel parts were heated at a temperature of 250° C. for baking by the high frequency hardening apparatus body 1 at frequency of 15 KHz, which was equipped with the pulse generator 3. The remaining conditions were similar to those in Example 1. As a result, a time required for heating one screw was as short as approximately 0.45 seconds, and a time required for baking the total amount of 100 kg was 1.2 hours, thus making it possible to largely reduce the time as compared with before. Also, no head-off was observed in the salt solution immersion test, which was conducted using 100 screws.

Example 3

The baking was performed in a manner similar to Example 1 except for the use of a high frequency hardening apparatus body equipped with an non-oxidizing furnace which contained a high frequency heating coil and was encapsulated with an argon gas. In this case, in spite of the fact that a time required for baking the total amount of 100 kg of tapping screws was 0.7 hours, i.e., the baking was completed in a shorter time, the head-off was not at all found in the salt solution immersion test which was conducted using 100 screws. In addition, the surfaces of the tapping screws exhibited fair surface states without generation of surface scale.

Comparative Example 1

100 kg of tapping screws manufacturing in a manner similar to Example 1 were placed in a batch-type annealing furnace for the baking at 200° C. in a similar manner to before. For eliminating the occurrence of head-off, and emitting diffusive hydrogen or making it harmless in the salt solution immersion test, heating was required by the batch type annealing furnace at 200° C. for as long as four hours. Also, for elevating the furnace temperature to 200° C., another 1.5 hours were required, so that a total of 5.5 hours were required.

Comparative Example 2

100 kg of tapping screws each having 6 g were manufactured in a manner similar to Example 1, galvanized in a thickness of 10 μm, and then left for 24 hours. Subsequently, the salt solution immersion test was conducted for 500 screws without the baking, to investigate the number of screws which were experienced head-off, in a manner similar to Example 1. The head-off was found in eight of 500 screws.

From the foregoing results, it was confirmed that according to the processing method of the present invention, the baking could be performed in an extremely short time, and delayed fracture caused by diffusive hydrogen could be completely prevented.

INDUSTRIAL AVAILABILITY

As described above, since the baking method of steel parts according to the present invention uses a high frequency or ultra-high frequency as heating means for removing diffusive hydrogen occluded in a steel product or making it harmless, it is possible to rapidly heat surface layers of parts and efficiently process them as well as to avoid an increase in size, higher cost and the like of the facilities. In this event, particularly, surface layers of steel parts may be effectively processed in a predetermined temperature range with the high frequency or ultra-high frequency set at a predetermined value or higher. Further, the surface layers can be processed in an extremely short time when the surface layers are heated by pulse energy of high frequency or ultra-high frequency to generate a difference in temperature between the surface layers and interiors of the parts. Such processing is particularly effective for processing parts having a plating layer, which includes a large amount of hydrogen.

Then, the present invention can largely reduce a conventional baking time to significantly cut down the manufacturing cost, so that it has an industrially useful value.

What is claimed is:

1. A method of baking treatment of steel product parts which comprises heating surface layers of the steel parts with a high frequency or an ultra-high frequency, the method effective for transferring diffusive hydrogen to non-diffusive hydrogen and further effective for removing the diffusive hydrogen.

2. A method of baking treatment of steel product parts which comprises heating surface layers of the steel parts with a high frequency or an ultra-high frequency to generate a difference in temperature between the surface layers and interiors of the parts, the heating effective for causing distortion in lattices, the method effective for transferring diffusive hydrogen to non-diffusive hydrogen and further effective for removing the diffusive hydrogen.

3. The method of baking treatment of steel product parts according to claim 1, wherein the steel parts are plated on surfaces thereof.

4. The method of baking treatment of steel product parts according to claim 1, wherein the high frequency or ultra-high frequency is a frequency equal to or greater than 10 KHz.

5. The method of baking treatment of steel product parts according to claim 1, wherein the surface layers of the steel parts are heated at temperatures in a range of 100 to 300° C.

6. The method of baking treatment of steel product parts according to claim 1, 2, 3, 4 or 5, wherein the baking is performed in a non-oxidizing atmosphere.

7. The method of baking treatment of steel product parts according to claim 1, 2, 3, 4 or 5, wherein the baking is performed in an atmosphere with a negative pressure.

8. The method of baking treatment of steel product parts according to claim 1, 2, 3, 4 or 5, wherein the baking is performed in a vacuum atmosphere.

9. The method of baking steel parts according to claim 1, 2, 3, 4 or 5 wherein surface layers of the steel parts is heated with induction heating of pulsative output at a high frequency or an ultra-high frequency.

10. The method of baking steel parts according to claim 1, 2, 3, 4 or 5 wherein surface layers of the steel parts is heated with induction heating of pulsative output at frequencies equal to or higher than 5 MHz.

11. The method of baking steel parts according to claim 1, 2, 3, 4 or 5 wherein surface layers of the steel parts is heated with induction heating of pulsative output at a high frequency or an ultra-high frequency in an atmosphere with a negative pressure.

12. The method of baking steel parts according to claim 11, wherein the baking is performed in a vacuum atmosphere.

13. A method of baking treatment of steel product parts which comprises heating surface layers of the steel parts with induction heating of pulsative output at a high frequency or an ultra-high frequency.

14. A method of baking treatment of steel product parts which comprises heating surface layers of the steel parts with induction heating of pulsative output at frequencies in a range of 1 KHz to 5 MHz.

15. A method of baking treatment of steel product parts which comprises heating surface layers of the steel parts with induction heating of pulsative output at frequencies equal to or higher than 5 MHz.

16. A method of baking treatment of steel product parts according claim 13, 14 or 15, wherein the baking is performed in an atmosphere with a negative pressure.

17. The method of baking treatment of steel product parts according to claim 16, wherein the baking is performed in a vacuum atmosphere.

18. A method of baking treatment of steel product parts which comprises heating surface layers of the steel parts with a high frequency or an ultra-high frequency in an atmosphere with a negative pressure.

19. The method of baking treatment of steel product parts according to claim 18, wherein the baking is performed in a vacuum atmosphere.

* * * * *